United States Patent
Phillips et al.

(10) Patent No.: US 9,438,487 B2
(45) Date of Patent: Sep. 6, 2016

(54) BANDWITH POLICY MANAGEMENT IN A SELF-CORRECTED CONTENT DELIVERY NETWORK

(71) Applicant: ERICSSON TELEVISION INC., Duluth, GA (US)

(72) Inventors: Chris Phillips, Hartwell, GA (US); Jimmie Rodgers, Lawrenceville, GA (US)

(73) Assignee: ERICSSON AB, Stockholm (SE)

( * ) Notice: Subject to any disclaimer, the term of this patent is extended or adjusted under 35 U.S.C. 154(b) by 255 days.

(21) Appl. No.: 13/935,381

(22) Filed: Jul. 3, 2013

(65) Prior Publication Data

US 2015/0012656 A1    Jan. 8, 2015

(51) Int. Cl.
| | |
|---|---|
| G06F 15/173 | (2006.01) |
| H04L 12/24 | (2006.01) |
| H04L 12/911 | (2013.01) |
| H04L 12/813 | (2013.01) |
| H04L 12/825 | (2013.01) |
| H04L 12/835 | (2013.01) |
| H04L 12/26 | (2006.01) |

(52) U.S. Cl.
CPC ........... *H04L 41/509* (2013.01); *H04L 41/145* (2013.01); *H04L 43/0882* (2013.01); *H04L 47/20* (2013.01); *H04L 47/26* (2013.01); *H04L 47/30* (2013.01); *H04L 47/70* (2013.01); *H04L 41/0893* (2013.01); *H04L 41/0896* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 6,035,280 A | 3/2000 | Christensen | |
| 6,119,143 A * | 9/2000 | Dias | G06F 9/505 709/201 |
| 6,909,726 B1 * | 6/2005 | Sheeran | H04L 12/2801 370/395.41 |
| 8,209,333 B2 | 6/2012 | Hubbard et al. | |
| 8,432,808 B1 | 4/2013 | Dankberg et al. | |
| 8,549,570 B2 | 10/2013 | Forsman et al. | |
| 2002/0007417 A1 | 1/2002 | Taylor et al. | |
| 2002/0152318 A1 | 10/2002 | Menon et al. | |
| 2004/0042479 A1 | 3/2004 | Epstein et al. | |

(Continued)

FOREIGN PATENT DOCUMENTS

WO    WO 2013/064505 A1    5/2013

OTHER PUBLICATIONS

NPL: Acharya et al. "Balancing Push and Pull for Data Broadcast", ACM SIGMOD Conference, Jun. 1997.*

*Primary Examiner* — Wing F Chan
*Assistant Examiner* — Padma Mundur

(57) ABSTRACT

In one embodiment of a network pipe optimization method, a network element may obtain at least one of a push pipe utilization report and a pull pipe utilization report from each distribution node of the content delivery network. Based on the utilization reports, the network element may determine new push pipe weights and new pull pipe weights for distribution pipes associated with each distribution node of the content delivery network. Using at least one of the new push pipe weights and new pull pipe weights, a network pipe utilization model associated with the content delivery network may be simulated. Responsive to determining that the simulated network pipe utilization model yields an improved utilization of the content delivery network, the new push pipe weights and new pull pipe weights may be distributed to each distribution node in the content delivery network.

14 Claims, 13 Drawing Sheets

(56) References Cited

U.S. PATENT DOCUMENTS

| | | |
|---|---|---|
| 2004/0128343 A1 | 7/2004 | Mayer |
| 2004/0133466 A1 | 7/2004 | Redmond et al. |
| 2006/0294132 A1 | 12/2006 | Hsieh et al. |
| 2007/0220411 A1 | 9/2007 | Hauser |
| 2008/0089241 A1 | 4/2008 | Lloyd et al. |
| 2008/0172274 A1 | 7/2008 | Hurowitz et al. |
| 2008/0273591 A1 | 11/2008 | Brooks et al. |
| 2008/0300975 A1 | 12/2008 | Dawson et al. |
| 2009/0031354 A1 | 1/2009 | Riley et al. |
| 2009/0110392 A1* | 4/2009 | Walid ................ H04Q 11/0067 398/25 |
| 2009/0207839 A1 | 8/2009 | Cedervall et al. |
| 2010/0005046 A1 | 1/2010 | Segel |
| 2010/0023580 A1 | 1/2010 | Hasegawa et al. |
| 2010/0151816 A1 | 6/2010 | Besehanic et al. |
| 2010/0241513 A1 | 9/2010 | Prasad et al. |
| 2010/0251313 A1 | 9/2010 | Mao |
| 2011/0040603 A1 | 2/2011 | Wolfe |
| 2011/0083037 A1 | 4/2011 | Bocharov et al. |
| 2011/0107379 A1 | 5/2011 | Lajoie et al. |
| 2011/0125765 A1 | 5/2011 | Tuli |
| 2011/0131591 A1 | 6/2011 | Henderson |
| 2011/0138064 A1 | 6/2011 | Rieger et al. |
| 2011/0320715 A1 | 12/2011 | Ickman et al. |
| 2012/0198070 A1 | 8/2012 | Black et al. |
| 2012/0284759 A1 | 11/2012 | Lv et al. |
| 2012/0297431 A1 | 11/2012 | Wang |
| 2013/0085864 A1 | 4/2013 | Ahmed et al. |
| 2013/0124679 A1 | 5/2013 | Harrang et al. |
| 2013/0198204 A1 | 8/2013 | Williams et al. |
| 2013/0262766 A1 | 10/2013 | Lee et al. |
| 2013/0268989 A1 | 10/2013 | Lawson et al. |
| 2013/0311408 A1 | 11/2013 | Bagga et al. |
| 2014/0006950 A1 | 1/2014 | Chetlur et al. |
| 2014/0026052 A1 | 1/2014 | Thorwirth et al. |
| 2014/0032761 A1 | 1/2014 | Beveridge |
| 2014/0068076 A1 | 3/2014 | Dasher et al. |
| 2014/0122465 A1 | 5/2014 | Bilinski et al. |
| 2014/0129939 A1 | 5/2014 | Story et al. |
| 2014/0200958 A1 | 7/2014 | Wagenblatt |
| 2014/0215051 A1 | 7/2014 | Schlack et al. |
| 2014/0280213 A1 | 9/2014 | Isquith et al. |
| 2014/0280764 A1 | 9/2014 | Dasher et al. |
| 2014/0282770 A1 | 9/2014 | McKinley et al. |
| 2014/0304372 A1 | 10/2014 | Phillips et al. |
| 2014/0358630 A1 | 12/2014 | Bhagat et al. |
| 2014/0365452 A1 | 12/2014 | Ma et al. |
| 2014/0365460 A1 | 12/2014 | Portnoy et al. |
| 2015/0006544 A1 | 1/2015 | Isquith et al. |

* cited by examiner

BANDWITH POLICY MANAGEMENT IN A SELF-CORRECTED CONTENT DELIVERY NETWORK

CROSS-REFERENCE TO RELATED APPLICATION(S)

This application discloses subject matter that is related to the subject matter of the following U.S. patent application(s): (i) "SYSTEM AND METHOD FOR DELIVERING CONTENT IN A CONTENT DELIVERY NETWORK", application Ser. No. 13/935,326, filed Jul. 3, 2013, in the name(s) of Christopher Phillips et al., (ii) "BANDWITH MANAGEMENT FOR OVER-THE-TOP ADAPTIVE STREAMING", application Ser. No. 13/845,320, filed Mar. 18, 2013, in the name(s) of Christopher Phillips et al., (iii) "REGULATING CONTENT STREAMS FROM A WEIGHTED FAIR QUEUING SCHEDULER USING WEIGHTS DEFINED FOR USER EQUIPMENT NODES", application Ser. No. 13/597,333, filed Aug. 29, 2012, in the name(s) of Christopher Phillips et al., (iv) "METHODS AND APPARATUS FOR MANAGING NETWORK RESOURCES USED BY MULTIMEDIA STREAMS IN A VIRTUAL PIPE", application Ser. No. 13/403,075, filed Feb. 23, 2012, in the name(s) of Christopher Phillips et al., and (v) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK", application Ser. No. 13/856,895, filed Apr. 4, 2013, in the name(s) of Christopher Phillips et al., each of which is hereby incorporated by reference in its entirety.

FIELD OF THE DISCLOSURE

The present disclosure generally relates to communication networks. More particularly, and not by way of any limitation, the present disclosure is directed to bandwidth policy management in a self-corrected content delivery network.

BACKGROUND

A content delivery network or CDN (sometimes also referred to as a content distribution network) typically distributes content in a "best effort" fashion across the nodes throughout a network using technologies such as adaptive bitrate (ABR) streaming. It is known, however, that ABR can result in unfair and sometimes incongruous apportionment of bandwidth on a network based upon the order multiple clients begin to use a network resource. Since the bandwidth usage is typically determined by a client requesting the content, and because the ABR clients can be opportunistic, they may become greedy. For instance, a client device that has a low resolution (e.g., a cellular phone) may end up consuming a disproportionate amount of the bandwidth when compared to the bandwidth required for a higher resolution device such as, e.g., a high-definition TV (HDTV). Issues pertaining to such misappropriation of bandwidth are expected to become even more pronounced when higher bandwidth options become available. Relatedly, CDNs are also afflicted with issues relative to congestion at different nodes.

SUMMARY

The present patent disclosure is broadly directed to bandwidth policy management based on a policy-management and popularity determination scheme wherein content may be pre-determined to be popular by location and demographics using multiple sources. At least some of the embodiments of the present disclosure may advantageously optimize CDN traffic flows to nodes that may experience congestion by pre-provisioning content based on the popularity determinations and distributions. By pre-provisioning adaptive streaming packages or content, especially during initial caching, an operator can save a significant amount of CDN distribution bandwidth as user requests for the contents are serviced and/or redirected by the CDN. In some alternative embodiments, policy management for the pushing of content and for the pulling of content may be applied throughout the hierarchical organization of a CDN, thereby potentially realizing a better Quality of Service (QoS) and network bandwidth distribution for the pulled content. Further, one or more additional embodiments of the present disclosure may be configured to facilitate optimization of push and pull pipes of a CDN based on current network distribution and utilization as well as anticipated future content distribution and/or utilization.

In one aspect, an embodiment of a network pipe optimization method operable in a CDN is disclosed. The claimed embodiment comprises obtaining at least one of a push pipe utilization report and a pull pipe utilization report from one or more distribution nodes of the CDN. New push pipe weights and new pull pipe weights for distribution pipes associated with each of select distribution nodes of the CDN may be calculated or otherwise determined at least based on the pipe utilization reports received from the nodes. Using at least one of the new push pipe weights and new pull pipe weights, a network pipe utilization model associated with the CDN may be simulated. Responsive to determining that the simulated network pipe utilization model yields an improved utilization of the content delivery network, the new push pipe weights and new pull pipe weights may be distributed to each of select distribution nodes in the CDN. In another aspect, an embodiment of a network element operable as a pipe optimization node in association with a CDN is disclosed. The claimed network element comprises one or more processors and a memory subsystem coupled to the one or more processors, wherein the memory subsystem includes a persistent memory (e.g., nonvolatile memory such as Flash memory). A network pipe optimization module may be implemented in the persistent memory that is configured to be executed by the one or more processors for performing an optimization method set forth hereinabove. In a still further aspect, an embodiment of a non-transitory computer-readable medium containing instructions stored thereon is disclosed. When the stored instructions are executed by a computer system configured to operate as a pipe optimization node, the computer system is operable to perform an embodiment of the method set forth above.

In another aspect, an embodiment of a method of managing pull pipe bandwidth in a CDN is disclosed. The claimed embodiment comprises redirecting a request for a particular content to an edge server node that is pre-provisioned for a push policy based on a popularity distribution associated with the requested particular content. A pull pipe portion of a regional level distribution pipe outgoing from a regional server node to the edge server node may be adjusted, wherein a pull pipe weight is assigned to the regional level distribution pipe upon taking into account an expected push pipe bandwidth consumption via the regional distribution pipe for the particular content such that a QoS requirement associated with delivery of the particular content to a requesting subscriber is satisfied.

In a still further aspect, an embodiment of a system for managing pull pipe bandwidth in a CDN is disclosed. The claimed embodiment comprises a request redirector node for redirecting a request for a particular content to an edge server node based on a popularity distribution associated with the requested particular content. Associated with the request redirector node is a means or component configured for adjusting a pull pipe portion of a regional level distribution pipe outgoing from a regional server node to the edge server node, wherein a pull pipe weight is assigned to the regional level distribution pipe upon taking into account an expected push pipe bandwidth consumption via the regional distribution pipe for the particular content such that a QoS requirement associated with delivery of the particular content to a requesting subscriber is satisfied.

In a still further aspect, an embodiment of a non-transitory computer-readable medium containing instructions stored thereon is disclosed. When the stored instructions are executed by a computer system configured to operate as a CDN policy management node, the computer system is operable to perform an embodiment of the pull pipe bandwidth management method set forth above.

Further features of the various embodiments are as claimed in the dependent claims. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
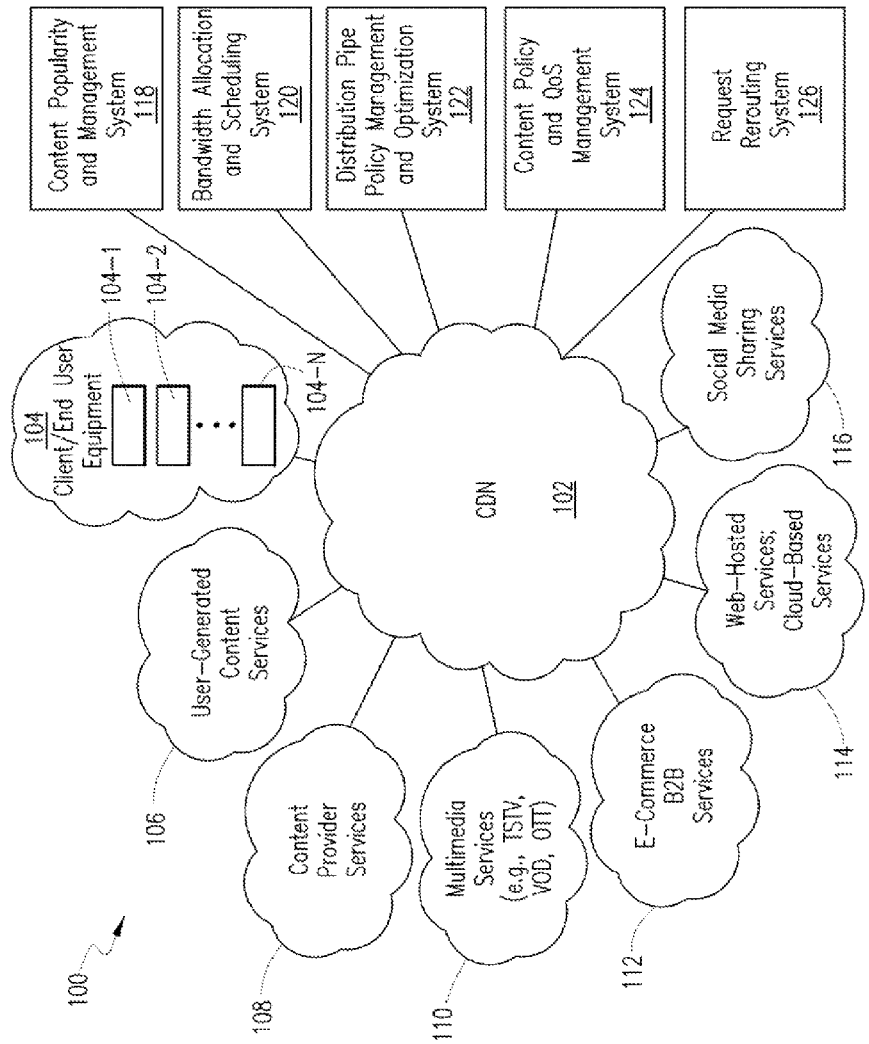
FIG. 1 depicts an example network environment including a content delivery network wherein one or more embodiments of the present patent application may be practiced.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple networking functions (e.g., A/V media management, session control, QoS policy enforcement, and/or subscriber management, and the like), in addition to providing support for multiple application services (e.g., data and multimedia applications). Subscriber end stations or client devices (e.g., set-top boxes, PVR/DVRs, servers, workstations, laptops, netbooks, palm tops, mobile phones, smartphones, multimedia phones, Voice Over Internet Protocol (VOIP) phones, user equipment, terminals, portable media players, location-aware subscriber equipment, gaming systems or consoles, etc.) may access or consume content/services provided over a content delivery network implemented in accordance with one or more embodiments set forth herein. Further, the client devices may also access or consume content/services provided over broadcast networks (e.g., cable and satellite networks) as well as a packet-switched wide area public network such as the Internet via suitable service provider access networks. In a still further variation, the client devices or subscriber end stations may also access or consume content/services provided on virtual private networks (VPNs) overlaid on (e.g., tunneled through) the Internet.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example network environment 100 including a content delivery network or content distribution network (CDN) 102 wherein one or more embodiments of the present patent application may be practiced. For purposes of the present patent application, CDN 102 may comprise an overlay network architected for high-performance delivery of a variety of digital assets or program assets as well as services (hereinafter referred to as "content") to subscribers using one or more Internet-based infrastructures, private/dedicated infrastructures or a combination thereof. In general, CDN 102 may be deployed in a number of applications to provide services such as media delivery/distribution services, web acceleration/optimization services, website caching/file delivery services, cloud-based software delivery services, etc. for virtually any website or Internet-based service with respect to its users or subscribers depending on the implementation scenario. Accordingly, the terms "content" or "program content product" as used in reference to at least some embodiments of the present patent disclosure may include digital assets and program assets such as any type of audio/video content or program segment, streaming or static, (e.g., recorded over-the-air free network television (TV) shows or programs, pay TV broadcast programs via cable networks or satellite networks, free-to-air satellite TV shows, IPTV programs, Over-The-Top (OTT) and video-on-demand or movie-on-demand shows or programs) as well as other content assets provided by content publishers, owners or providers, including but not limited to software files, executable computer code or programs, blogs, web chats, newscasts, sportscasts, online electronic games, Internet radio shows/programs, entertainment programs, weather programs, educational programs, movies, still images, graphics, ring tones, specialty infomercials or documentary programs, ethnic programs in different languages, music video programs, and the like. By way of illustration, reference numeral 106 refers to user-generated content distribution services (e.g., YouTube®) that may employ the overlay infrastructure of CDN 102 for facilitating delivery of user-generated or user-posted content responsive to user requests. Likewise, reference numeral 108 refers to one or more content providers, owners or publishers that make digital content available for delivery via the infrastructure of CDN 102 to their respective subscribers in another additional or alternative implementation. Multimedia services 110 may also interface with CDN 102 for facilitating optimized delivery of content according to one or more aspects of the present patent application. Typically, such multimedia services 110 may include time-shifted TV systems (TSTV), various video-on-demand (VOD) systems including movie-on-demand (MOD) services, subscription VOD (SVOD) services, etc., OTT systems including third-party content providers such as Netflix®, Hulu®, or myTV, Amazon® Instant Video, as well as other digital rights management (DRM)-based online media stores and IPTV providers, in addition to network-based video recorder services such as TiVo® or ReplayTV® services, national/local media campaign systems or repositories of commercials, bulletins, and the like. In another additional or alternative implementation, CDN 102 may be interfaced with e-commerce or business-to-business (B2B) services 112 that may include owners of e-commerce websites concerned about response times for browsers and transaction times for online buyers, retailers wishing to broadcast promotional media events from stores, e-learning developers such as virtual universities or colleges, TV/radio stations and entertainment companies leveraging the Internet/web to deliver entertainment services, online stock/financial news distribution services, etc. Additionally or alternatively, CDN 102 may also interface with web-hosted services and/or cloud based storage/software service providers 114 for effectuating delivery/downloading of software such as executable code, including operating systems, kernels, software patches, browsers, device drivers, etc., as well as application programs, databases, and any upgrades thereof, and/or user data. In a still further additional or alternative implementation, various social media sharing services 116 (e.g., Facebook®, Twitter®, Pinterest®, Instagram®, etc.) may be interfaced with CDN 102 for facilitating delivery and distribution of shared media (video clips, audio clips, photos, etc.) among respective subscribers.

By way of further illustration, reference numeral 104 refers to various client devices or user equipment (UE) devices 104-1 to 104-N associated with subscribers/users for consuming content delivered via CDN 102 in any type or number of access technologies including broadband access via wired and/or wireless (radio) communications. For example, some of the UE devices 104-1 to 104-N may comprise appliances that not only receive program assets for live viewing, playback and/or rendering, but also operate as command consoles that can accept user inputs, commands or requests to interact with a network element disposed in CDN 102 for requesting content that may be subject to licensing windows or available for free. Accordingly, example subscriber client devices may include TVs, PCs, laptops, notebook computers, networked DVD/HD/Blu-ray players, tablets, discrete set top boxes (STBs), virtual STBs, integrated TV/STBs, personal/digital video recorders (PVRs/DVRs), smartphones, smart TVs, gaming consoles (such as the Wii®, Play Station 3®, Xbox 360®), and the like. The distribution network infrastructure of CDN 102 may therefore be configured to support a number of distribution formats such as, e.g., Adobe® Flash®, iDevice, Microsoft® Silverlight®, HTTP streaming (for instance, Dynamic Adaptive Streaming over HTTP or DASH, HTTP Live Streaming or HLS, HTTP Dynamic Streaming or HDS, etc.), Icecast, and so on.

Whereas CDN 102 may be realized as a commercially operated private/dedicated network maintained by a third-party provider/operator, at least a portion of CDN 102 may be provided in some example implementations as part of a content provider network, an Internet Service Provider (ISP) network, or a telecommunications service provider network. In general, the overlay architecture of CDN 102 may include a multi-level, hierarchically-organized interconnected assembly of network servers for providing media pathways or "pipes" from one or more central distribution nodes to one or more levels of regional distribution nodes that are connected to one or more local edge servers configured to serve a plurality of end users or subscribers in respective serving location areas. In addition to such "distribution servers" (sometimes also referred to as "surrogates"), CDN 102 may also include and/or interoperate with various network elements configured to effectuate request redirection or rerouting mechanisms as well as related back-office systems such as subscriber management systems, account/billing systems and the like. Furthermore, CDN 102 may include and/or interoperate with one or more of the following systems: a content popularity and management system 118, a bandwidth allocation and scheduling system 120, a distribution pipe policy management and optimization system 122, a content policy and QoS management system 124, and a request routing/redirection mechanism 126, each of which may be implemented as one or more network nodes or elements for purposes of the present patent disclosure. As will be set forth in detail hereinbelow, various structural and/or functional components of the foregoing network elements may be realized as data processing nodes or computer systems that can interoperate with each other as well as other internal and external databases and systems for implementing one or more embodiments of the inventive subject matter disclosed herein.

Figure 2A:
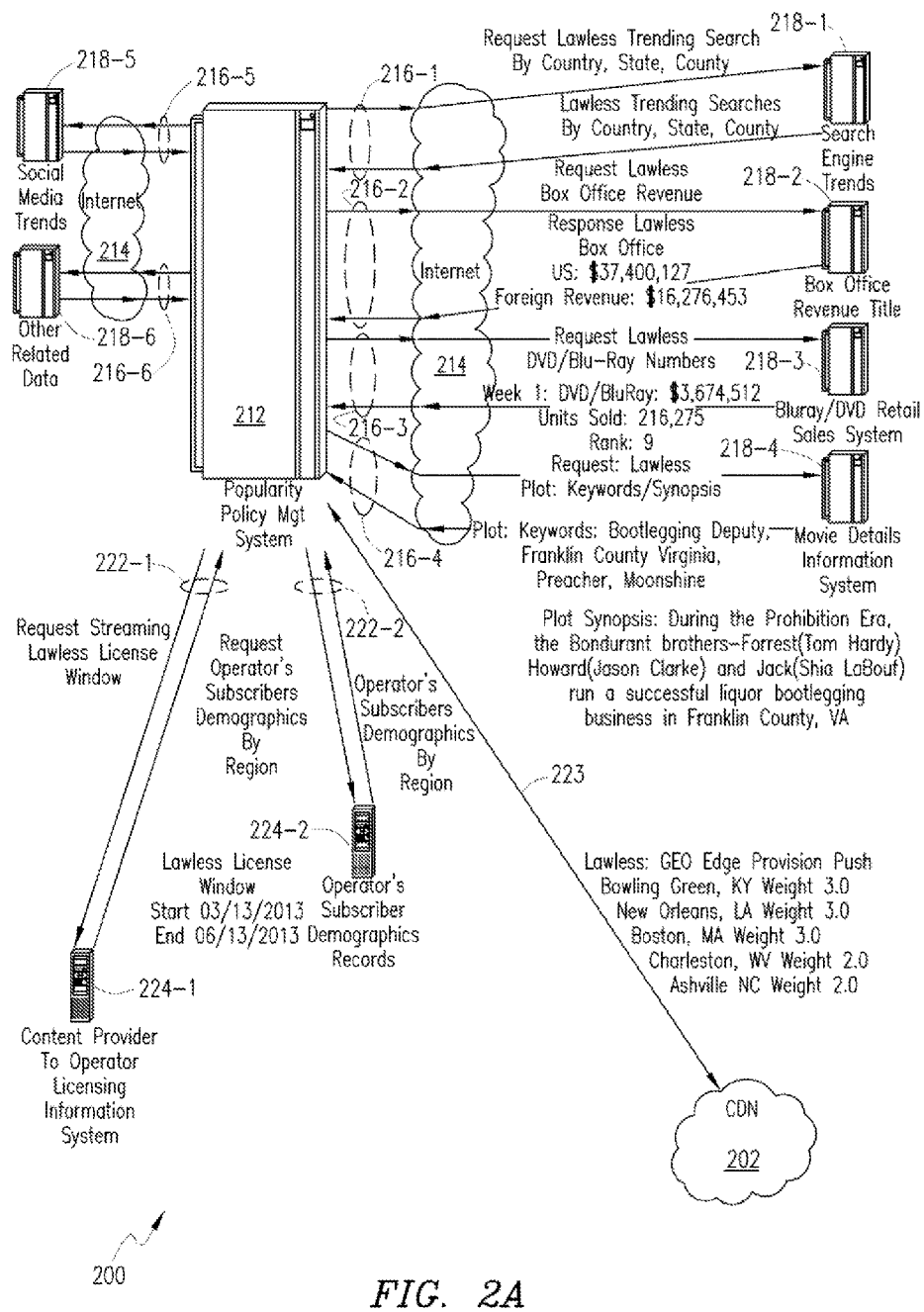
FIG. 2A depicts an example network environment wherein a popularity policy management system may be provided according to an embodiment of the present patent disclosure.

FIG. 2A depicts an example network environment 200 wherein a popularity policy management system 212 may be provided according to an embodiment of the present patent disclosure. It should be appreciated that the popularity policy management system 212 is illustrative of the system 118 shown in FIG. 1, and may be configured as a data processing node for effectuating one or more processes whereby content may be determined, pre-determined, forecasted or otherwise estimated to be popular by location and/or demographics using a plurality of sources. By way of implementation, the popularity policy management system 212 may be provided as part of a CDN 202 (which is illustrative of CDN 102 shown in FIG. 1) or as an element of an external network configured to provide popularity-based policy management interfacing and/or other related control inputs to CDN 202. Regardless of the specific implementation, the popularity policy management system 212 is provided with a number of interfaces for communicating with and obtaining information from one or more commercial and/or non-commercial databases, private and/or public databases, Internet-based data sources, content provider network databases, network operator databases, etc. based on content-related query/response mechanisms or push notifications effectuated over a public wide-area packet-switched network (e.g., the Internet) 214 and/or a combination of intranets, extranets, enterprise networks, and the like. Illustratively, such data may be related to a particular content (e.g., the movie Lawless) that is designated or otherwise subject to a delivery agreement between the OTT service provider, original content owner/provider and the operator of CDN 202 for delivery to a plurality of subscribers in a geographical region serviced by the infrastructure of CDN 202. Depending on the content and/or the scope of delivery, a geographical region serviced by CDN 202 may be worldwide, country-wide, region-wide, or any portion thereof. Interface 216-1 of the popularity policy management system 212 is operative to obtain trend data relative to the particular content available from various Internet search engine trend databases 218-1 associated with one or more search engines. For example, such databases 218-1 may be associated with search engines offered by Google®, Bing®, Yahoo®, and the like, where searches performed by Internet users relative to the content may be monitored and compiled based on geographic locations (e.g., by country, state, county, city/town, municipality, etc.), and may comprise searches involving keywords, one or more terms of the content's plot synopsis, title of the content, as well as searches relating to key actors, actresses, producers, directors, or other key personnel involved in the production/publishing of the content. Because such data may vary over time, temporal distributions or trending data of the searches is also monitored for purposes of providing as an input into one or more appropriate statistical/mathematical modeling techniques for forecasting the popularity of the content based on a suitable metric. Interfaces 216-2 and 216-3 are illustrative of interfaces operative to obtain marketing, sales, or other revenue data related to the content. Reference numeral 218-2 is illustrative of a box office revenue database system from which the popularity policy management system 212 may obtain the box office receipts data for the content (e.g., Lawless), which may be sorted or grouped based on spatial and/or temporal distributions (i.e., by location and/or trending). Similar to the Internet search trending data, the revenue/marketing data of a program content product may be made available at different granular levels (e.g., with a coarse granularity of a country-wide basis or with a finer granularity of a provincial or regional distribution within a country). Reference numeral 218-3 is illustrative of a retail sales database system that provides data of sales of storage media having the content such as Blu-ray, DVD, HD, and CD discs (i.e., content program products), etc. as well the quantities of units sold and any ranking data. Interface 216-4 may be provided with the popularity policy management system 212 that is operative to obtain content-specific data and/or metadata from an information system 218-4 having detailed information regarding the content, which information may be used by the system 212, for example, to determine the terms whose search trends and distributions need to be monitored, in order to perform or estimate relationships between the plot synopsis, geographical locations of interest (e.g., places where the plot takes place), actor biographies/profiles, etc. and the spatial clustering of the trends, sales, and the like, inter alia.

Continuing to refer to FIG. 2A, the popularity policy management system 212 may also be provided with an interface 216-5 for obtaining data information on how a content program and/or its key terms and other metadata are trending in the social media space, i.e., one or more social media sites 218-5 such as, e.g., Facebook®, Twitter®, Instagram®, Pinterest®, and the like. Additional interfaces 214-6 may also be provided to obtain various assortments of additional information from a host of public and/or private databases 218-6, including but not limited to publicly available demographic data of subscribers, related content data (i.e., data relating to another movie that has the same plot line as Lawless, perhaps with common actors and actresses, or a software title similar in functionality to the functionality of the particular content (being a downloadable software program asset in this example), or a similar video game title, etc.), marketing research/polls, opinion-makers' evaluations and predictions, and the like.

Depending on the commercial and/or service level arrangements between the operator of the popularity policy management system 212 and content providers, an interface 222-1 may be provided with the system 212 for obtaining applicable licensing window data relative to the content from a content provider network database 224-1. An additional interface 222-2 may be provided for obtaining demographic data and other data related to the subscribers of the content delivery service (e.g., an OTT content provider) from suitable databases 224-2. The popularity policy management system 212 may be configured to forecast an expected popularity distribution of the particular content using one or more data inputs described above in order to effectuate a push policy for pushing the content and/or pre-provisioning bandwidth for push pipes for the content through the delivery network, CDN 202, to various regional and/or local distribution nodes. As will be set forth below, such policy information may comprise assigning region-specific weight factors, priority levels, and other parametrics relative to the content, and may be communicated to one or more central nodes of CDN 202 via an interface 223. Additionally, such information may also be provided to other management nodes or systems of CDN 202, e.g., content policy and QoS management nodes, bandwidth allocation and scheduling nodes, pipe optimization nodes, etc. that may be operating at various hierarchical levels of CDN 202 for purposes of effectuating one or more additional embodiments of the present patent disclosure. Furthermore, the various management nodes as well as CDN distribution nodes may interact with the popularity policy management system 212 for providing assorted pieces of feedback information, e.g., error reporting, compliance notifications, queries relative to a push policy, pipe readjustment requests, congestion reporting, and the like.

Figure 2B:
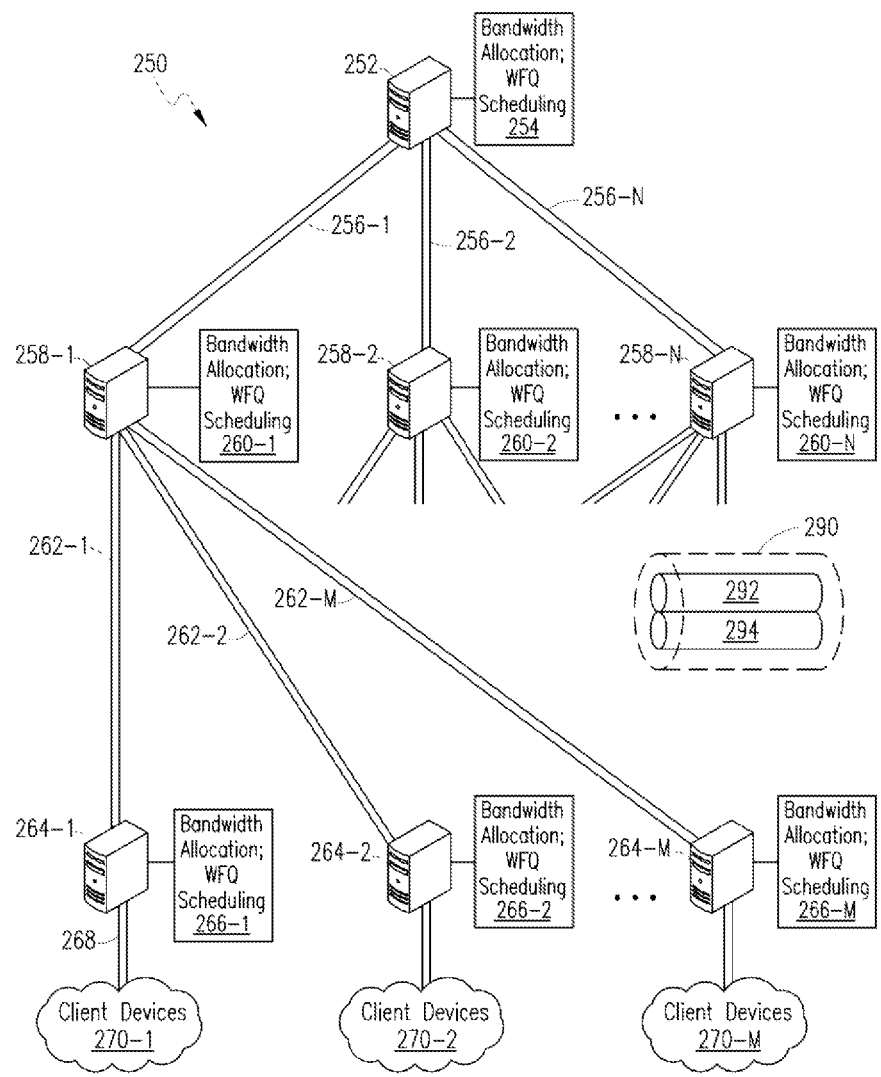
FIG. 2B depicts an example hierarchical arrangement of a content delivery network wherein one or more embodiments of the present patent application may be practiced.
Figure 3A:
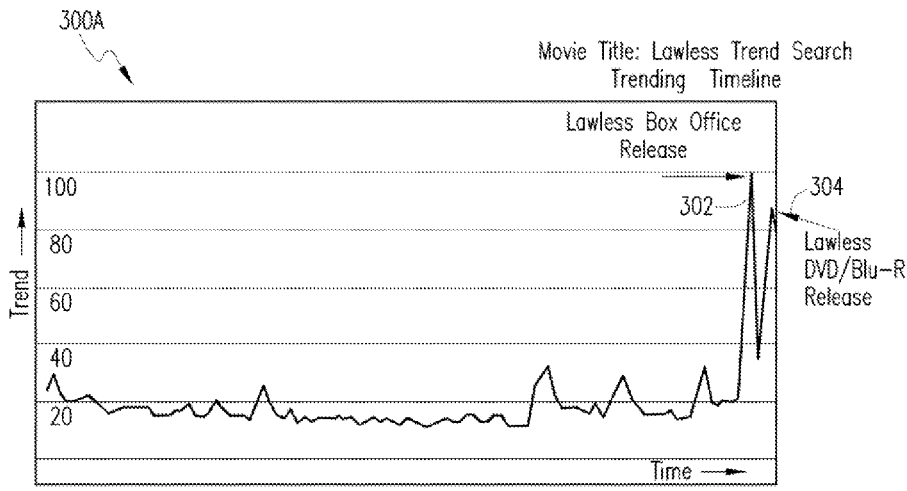
FIGS. 3A-3E depict various examples of data relevant to determining or otherwise estimating popularity of a particular content for purposes of an embodiment of the present patent disclosure.
Figures 3B, 3C, 3D:
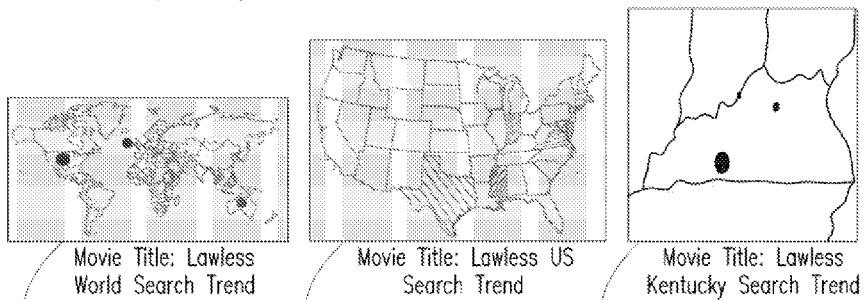
Figure 3E:
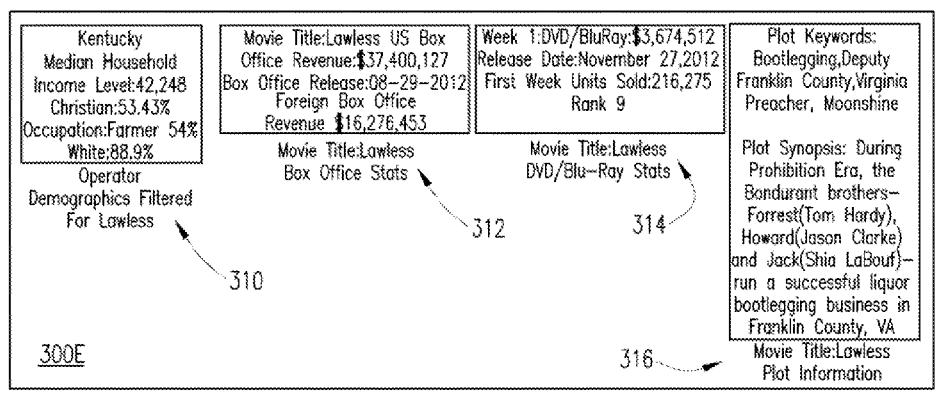

FIG. 2B depicts an example hierarchical arrangement of a content delivery network 250 that is illustrative of CDN 102 or CDN 202 described above, wherein one or more embodiments of the present patent application may be implemented. A plurality of network servers forming or otherwise operating as an overlay distribution infrastructure of CDN 250 may be disposed at multiple hierarchical levels, wherein each level may include nodes that may be mirrored or redundantly-architected for fault tolerance, load balancing, etc. Illustratively, one or more central distribution nodes 252 may represent a centralized data center infrastructure that may be coupled to a plurality of regional distribution nodes 258-1 to 258-N via a number of central distribution pipes 256-1 to 256-N. Each of the regional distribution nodes 258-1 to 258-N may in turn be coupled via regional distribution pipes to other sub-regional distribution nodes and/or to local edge servers that serve respective subscribers (i.e., deliver content to subscribers' client devices). By way of example, regional distribution node 258-1 is coupled to local edge servers 264-1 to 264-M via distribution pipes 262-1 to 262-M, wherein each local edge server is operable to serve subscriber client devices 270-1 to 270-M in its service area via suitable local access distribution pipes 268.

As shown in FIG. 2B, CDN 250 may include a plurality of hierarchically organized bandwidth allocation and scheduling modules configured to provide control information regarding priority levels and weights associated with the content and to allocate and manage bandwidth between push and pull pipe portions of outgoing bandwidth on a communication link (i.e., a distribution pipe) associated with a distribution node (i.e., bandwidth for content pulled responsive to user requests and bandwidth fro content being pre/provisioned pursuant to a push policy (e.g., popularity-based). Illustratively, a bandwidth allocation/scheduling module 254 is provided with the central distribution node 252, which may be configured to manage the outgoing bandwidth on the distribution pipes 256-1 to 256-N responsive to control inputs relative to content priorities, weight factors used in scheduling, subscriber/client device profiles, network pipe congestion, and other policies. Likewise, regional distribution nodes 258-1 to 258-N are provided with respective bandwidth allocation/scheduling modules 260-1 to 260-N for managing the outgoing bandwidth of respective regional distribution pipes (e.g., communication links 262-1 to 262-M). Bandwidth allocation/scheduling modules 266-1 to 266-M are illustrative of modules provided with respective local edge server nodes for managing the outgoing bandwidth to the served client devices.

Reference numeral 290 refers to an example distribution pipe whose total bandwidth capacity may be apportioned between a dynamically (re)sizeable push pipe portion 292 and a dynamically (re)sizeable pull pipe portion 294 for the delivery of content pursuant to pull content requests and/or push provisioning policies operating in conjunction with the multi-level bandwidth allocation/scheduling logic according to the teachings of the present patent disclosure. Aside from the bandwidth allocated for the delivery of content over the CDN, the distribution pipe 290 may also comprise bandwidth for other network traffic (e.g., other Internet usage). In addition to managing the overall push and pull pipe portions 292, 294, the respective bandwidth allocation/scheduling modules may also be configured to allocate bandwidth to individual content files within the push/pull pipe portions based on relative priorities, weights, classes and other factors etc. assigned to the respective content files. For example, if a distribution pipe has a total bandwidth of 40 Gbps that is to be allocated for the delivery of content over the CDN and the distribution pipe has a push weight factor of 3 and a pull weight factor of 1, the outgoing bandwidth is apportioned between 30 Gbps for the push pipe portion and 10 Gbps for the pull pipe portion of the link. In similar fashion, the respective push and pull pipe portions may be apportioned among the individual content files based on respective priorities and/or weights. As set forth previously in reference to FIG. 2A, the popularity policy management system 212 associated with the CDN may be configured to forecast a particular content's popularity distributions, both spatially and temporally, and may provide appropriate inputs (e.g., geographically distributed push weights, among others) to the distribution node(s) of the CDN so as to facilitate better bandwidth management.

FIGS. 3A-3E depict various examples of data relevant to determining or otherwise estimating popularity distributions of a particular content for purposes of an embodiment of the present patent disclosure. Taking reference to the example network environment 200 shown in FIG. 2A, reference numeral 300A in FIG. 3A refers to a trend metric that is monitored over time for the example particular content, Lawless, where peaks 302 and 304 refer to the trend graph peaking corresponding to certain events, e.g., box office release DVD/Blu-ray release of the movie, respectively. Reference numeral 300B in FIG. 3B refers to a worldwide search trend for the title where certain countries (e.g., US, Australia and Ireland) show different levels or magnitudes of search trends. Likewise, reference numerals 300C and 300D refer to country-wide and region-wide search trends that show different granular levels of the search trend data. It should be appreciated that search trend magnitudes at each granular level may be represented in a number of ways, e.g., bar graphs, pie-charts, different shading levels, raw numerical data, clustering, etc., which may be used in the popularity metrics calculations in order to indicate where and when the content is expected to be popular and to what extent. Reference numeral 300E refers to various pieces of data relevant to content popularity estimation modeling such as, e.g., subscriber demographic data 310, box office sales data 312, DVD/Blu-ray sales data 314 and plot synopsis and content information data 316.

Figure 4:
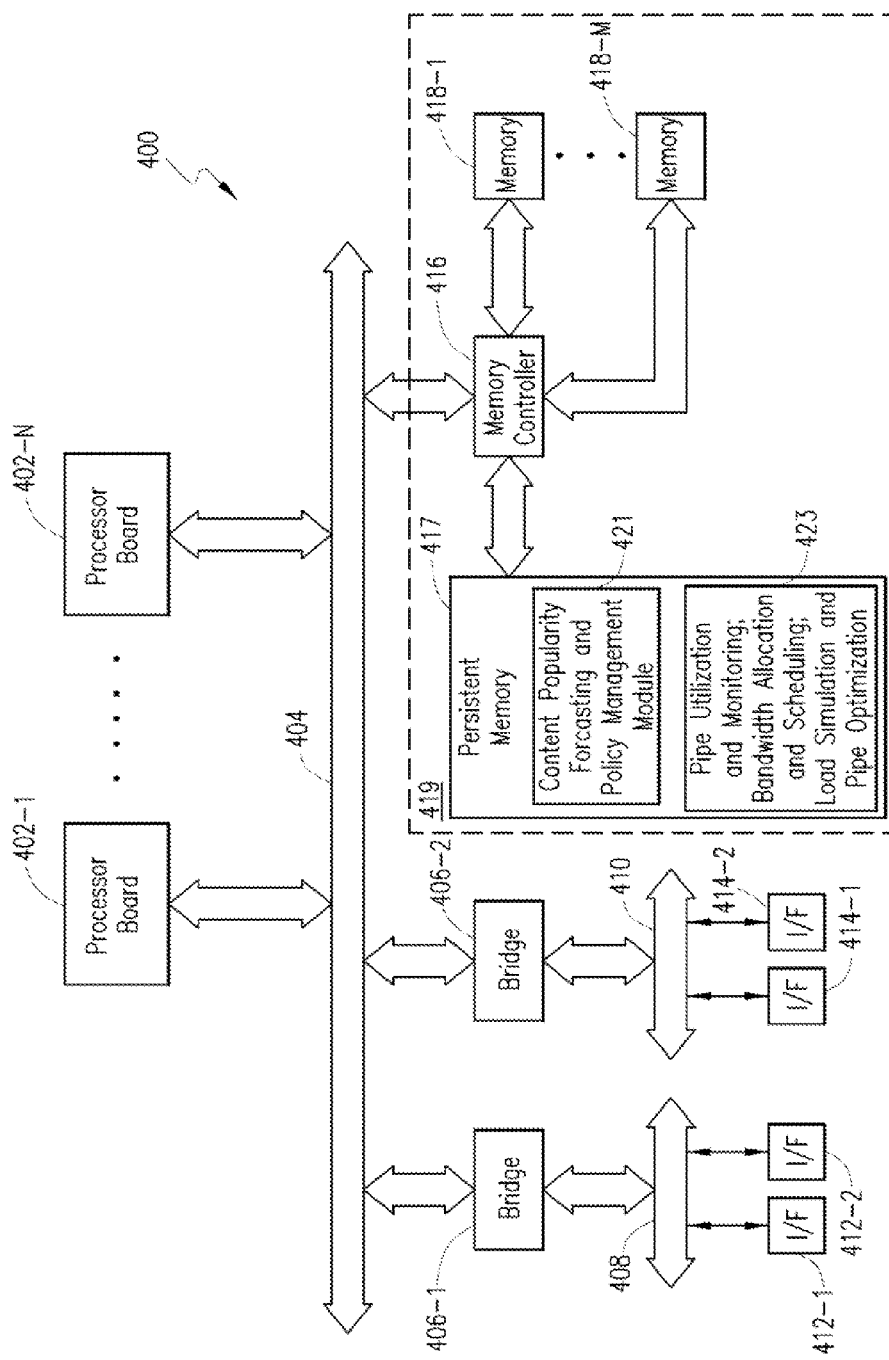
FIG. 4 depicts a block diagram of data processing computer system operable as one or more network elements configured to interoperate with or within a content delivery network for purposes of the present patent application.

FIG. 4 depicts a block diagram of a computer-implemented data processing system or node 400 operable as one or more network elements configured to interoperate with or within a content delivery network for purposes of the present patent application. Taking reference to FIGS. 1 and 4, the data processing node 400 may be configured depending on the application as an example implementation of the content popularity and management system 118, the bandwidth allocation/scheduling system 120, the distribution pipe policy management and optimization system 122, a content policy and QoS management system 124, or a request rerouting mechanism 126, or any combination thereof. One or more processors or processor boards 402-1 to 402-N coupled to a bus structure 404 provide for the overall control of the node 400, including executing one or more functionalities set forth below. Bus 404 may be coupled to one or more bus bridges or bus controllers 406-1, 406-2 for extending to or coupling to additional or peripheral buses 408, 410, which in turn may support a plurality of interfaces (I/F). Taking reference to FIG. 2, one or more of such interfaces 412-1, 412-2 may effectuate interfacing with external databases (e.g., search engine trend databases box office revenue databases, retail sales databases, content metadata, social media trend databases, subscriber demographic databases, etc.) for the popularity policy management system 212. Additional interfaces 414-1, 414-2 may effectuate interfaces to content provider networks, content licensing databases, subscriber demographics databases, and other related databases described above.

A memory subsystem 419 provided with the data processing node 400 may include one or more memory controllers 416 for controlling memory operations relative to a plurality of memory modules 418-1 to 418-M as well as nonvolatile memory modules such as persistent memory module 417. Program instructions or logic, which may be organized and/or executed as one or more software processes, modules, blocks, routines, threads, etc. may be stored in or uploaded/downloaded into the persistent memory 417 for effectuating one or more functionalities with respect to one or more embodiments of the present disclosure. For example, a content popularity forecasting and policy management module 421 may be configured to effectuate various statistical and mathematical modeling techniques involving, e.g., cluster analysis, multivariate analysis, principal component analysis, factor analysis, correlation analysis, adaptive neural networks, regression analysis, etc. to forecast popularity distributions based on a suitable popularity index or metrics, responsive to the various data inputs set forth above. Alternatively or additionally, one or more of modules 423 for effectuating, inter alia, bandwidth allocation/scheduling logic, pipe utilization/monitoring logic, content policy and QoS management logic, request redirection/rerouting logic, and load simulation/optimization logic may be provided in other implementations of the data processing node 400 for effectuating one or more processes embodied in the flowcharts described in detail below. Although not specifically illustrated in FIG. 4, it should be appreciated that at least a portion of the memory modules 418-1 to 418-M may comprise or be configured to operate as a storage device for the various pieces of data gathered via the interfaces in addition to any data, information and reports, etc. obtained from the CDN nodes or other management nodes for purposes of bandwidth allocation, queue scheduling, pipe optimization, etc.

Figure 5:
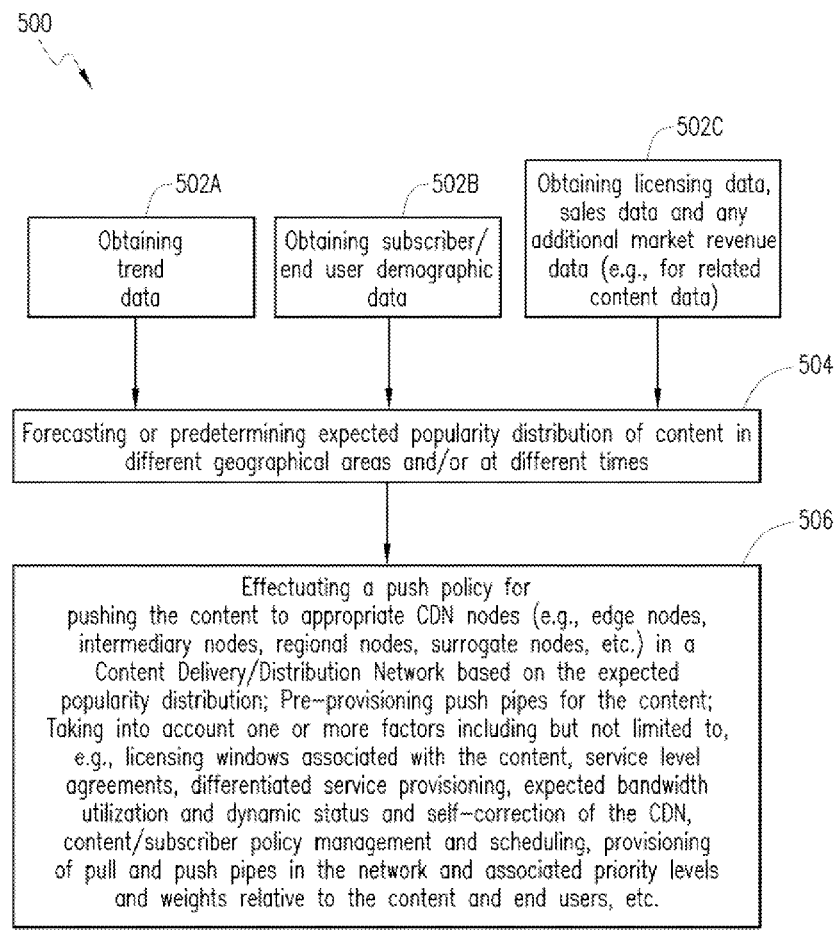
FIG. 5 depicts a flowchart of an example popularity-based content provisioning and delivery method according to an embodiment of the present patent application.

FIG. 5 depicts a flowchart of an example popularity-based content provisioning and delivery method 500 according to an embodiment of the present patent application. Blocks 502A, 502B and 502C are illustrative of operations, acts and steps with respect to obtaining content trend data, subscriber demographic data, as well as licensing data, market/revenue data and related data, respectively. Block 504 is illustrative of operations, acts and steps with respect to forecasting or predetermining expected popularity distributions of a particular content in different geographical areas, which may be time-dependent. A push policy may be effectuated for pushing the particular content to one or more nodes of a CDN based on the expected popularity distributions relative to the geographical area serviced by the CDN (block 506). For example, local edge servers and/or regional distribution nodes that are closest to the popularity clusters may be pre-provisioned with the media files of the particular content ahead of the licensing window start dates and/or subscribers' requests in order to optimize CDN traffic flow to CDN servers that may expect increased traffic. Any potential congestion involving such CDN servers may be mitigated at least partly because the pull data flow to such pre-provisioned locations is minimized. Further, after a particular content is targeted for push pre-provisioning, a current date may be compared against the streaming licensing start dates of the content (which may vary based on geographical regions of the subscribers) such that appropriate push weights may be assigned for the delivery of the content to the targeted edge servers based on the bandwidth speed at which the content needs to be provisioned prior to the licensing start dates. Additionally, push policy inputs may be provided a pipe optimization and management node for effectuating a self-corrective and adaptive bandwidth allocation mechanism with respect to the CDN (block 506).

Figure 6:
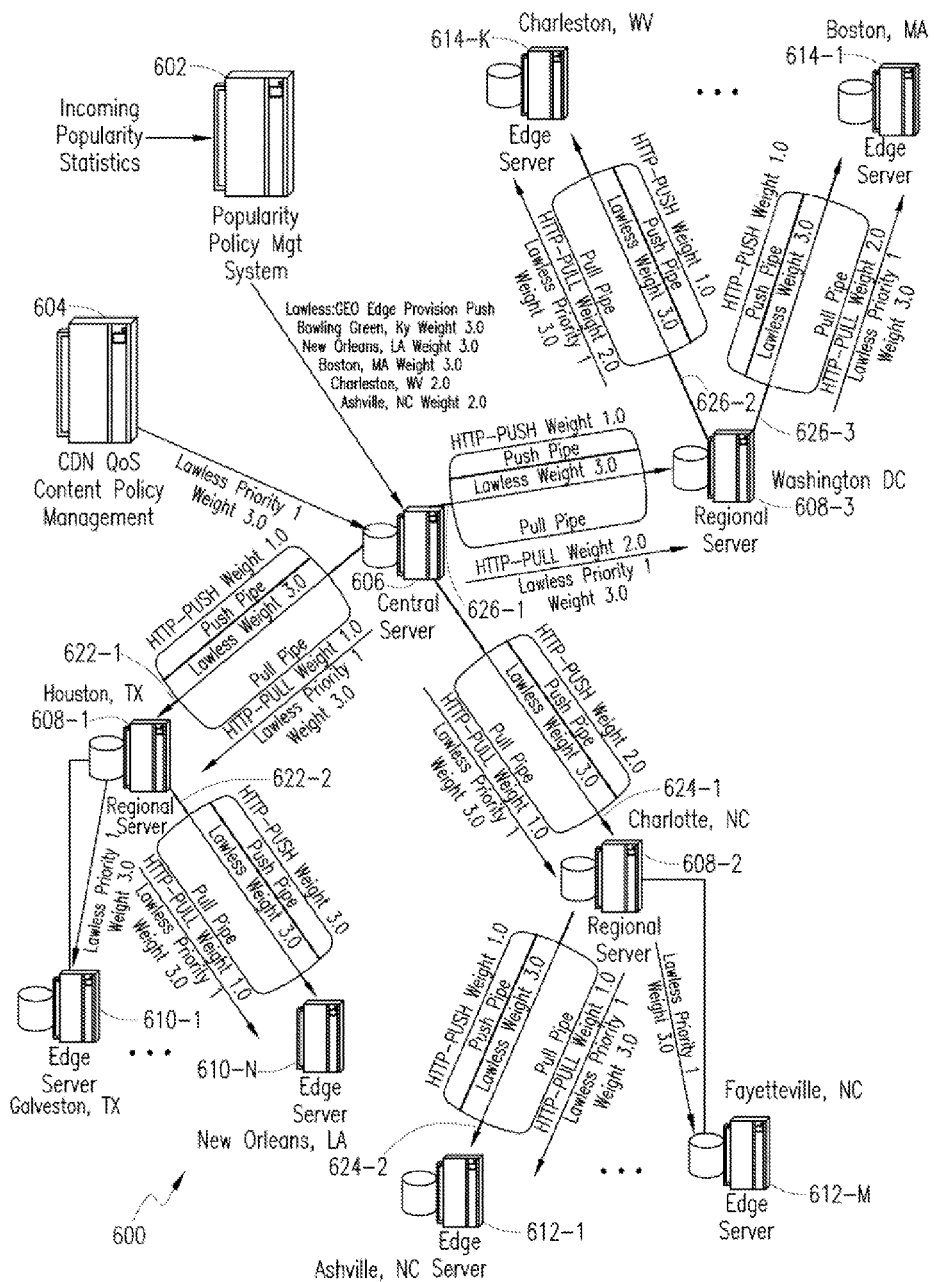
FIG. 6 depicts an example content delivery network having push and pull pipes provisioned with appropriate weights for central distribution pipes and regional distribution pipes of the delivery network.

Referring now to FIG. 6, depicted therein is an example content delivery network 600 having push and pull pipe portions provisioned with appropriate weights for central distribution pipes and regional distribution pipes of the delivery network 600. A popularity policy and management system 602 is operative to provide push policy inputs based on content popularity forecasting to a central server 606. As discussed previously, different push weights may be assigned for the content depending on the geographical distribution of the popularity metrics. Illustratively, the example content (i.e., Lawless) targeted for Bowling Green, Ky., is assigned a weight factor of 3.0, the content targeted for New Orleans, La., is assigned a weight factor of 3.0, the content targeted for Boston, Mass., is assigned a weight factor of 3.0, whereas the content targeted for Charleston, W. Va., is assigned a weight factor of 2.0 and the content targeted for and Ashville, N.C., is assigned a weight factor of 2.0. A content policy and QoS management node 604 associated with the CDN is operative to provide overall content-based priority levels and weights to the central server 606. Responsive to these inputs, the central server 606 may provision appropriate push pipes to various regional distributions servers 608-1 (Houston, Tex.), 608-2 (Charlotte, N.C.), and 608-3 (Washington, D.C.), each having certain weights and priority levels assigned thereto. As the push policy information and content priority level information may be distributed through the hierarchical CDN, respective regional servers may accordingly assign suitable push weights and priority levels for the content on their respective regional distribution pipes to the local edge servers coupled thereto. In this manner, push weights and priority levels may be distributed through the CDN for effectuating appropriate QoS policy management and bandwidth allocation.

By way of illustration, the central server 606 is coupled to the regional servers 608-1, 608-2, 608-2 via central distribution pipes 622-1, 624-1, 626-1, respectively. The regional server 608-1 is coupled to a plurality of local edge servers 610-1 to 610-N, wherein server 610-1 is operative to serve Galveston, Tex. and server 610-N is operative to serve New Orleans, La. Likewise, the regional server 608-2 is coupled to local edge servers 612-1 to 612-M, wherein server 612-1 is operative to serve Ashville, N.C. and server 612-M is operative to serve Fayetteville, N.C., and the regional server 608-3 is coupled to local edge servers 614-1 to 612-K, wherein server 614-1 is operative to serve Boston, Mass. and server 614-K is operative to serve Charleston, M. In one example implementation, distribution pipes 622-1 and 622-2 are illustrative of push pipe pre-provisioning from the central server to New Orleans, La., wherein the respective outgoing bandwidths may be allocated responsive to the different push pipe weights and pull pipe weights, which may be mediated by a respective bandwidth allocation and scheduling module associated therewith. Distribution pipes 624-1 and 624-2 are likewise illustrative of push pipe pre-provisioning from the central server to Ashville, N.C. and New Orleans, La. As a further illustration, distribution pipes 626-1 to 626-2 and 626-3, respectively, are exemplary of push pipe pre-provisioning from the central server to the edge servers serving Charleston, W A and Boston, Mass., respectively. Additional details with respect to allocating bandwidth on an outgoing CDN distribution pipe based on push/pull weights and priority levels, dynamic resizing of the pipes using, e.g., one or more pipe control nodes, and scheduling based on weighted fair queuing (WFQ), may be found in one or more of the following commonly owned co-pending U.S. patent application(s): (i) "BANDWITH MANAGEMENT FOR OVER-THE-TOP ADAPTIVE STREAMING", application Ser. No. 13/845,320, filed Mar. 18, 2013, in the name(s) of Christopher Phillips et al., (ii) "REGULATING CONTENT STREAMS FROM A WEIGHTED FAIR QUEUING SCHEDULER USING WEIGHTS DEFINED FOR USER EQUIPMENT NODES", application Ser. No. 13/597,333, filed Aug. 29, 2012, in the name(s) of Christopher Phillips et al., (iii) "METHODS AND APPARATUS FOR MANAGING NETWORK RESOURCES USED BY MULTIMEDIA STREAMS IN A VIRTUAL PIPE", application Ser. No. 13/403,075, filed Feb. 23, 2012, in the name(s) of Christopher Phillips et al., and (iv) "METHODS, APPARATUS, AND COMPUTER PROGRAM PRODUCTS FOR ALLOCATING BANDWIDTH FOR PUSH AND PULL CONTENT REQUESTS IN A CONTENT DELIVERY NETWORK", application Ser. No. 13/856,895, filed Apr. 4, 2013, in the name(s) of Christopher Phillips et al., cross-referenced hereinabove and hereby incorporated by reference herein.

Figure 7:
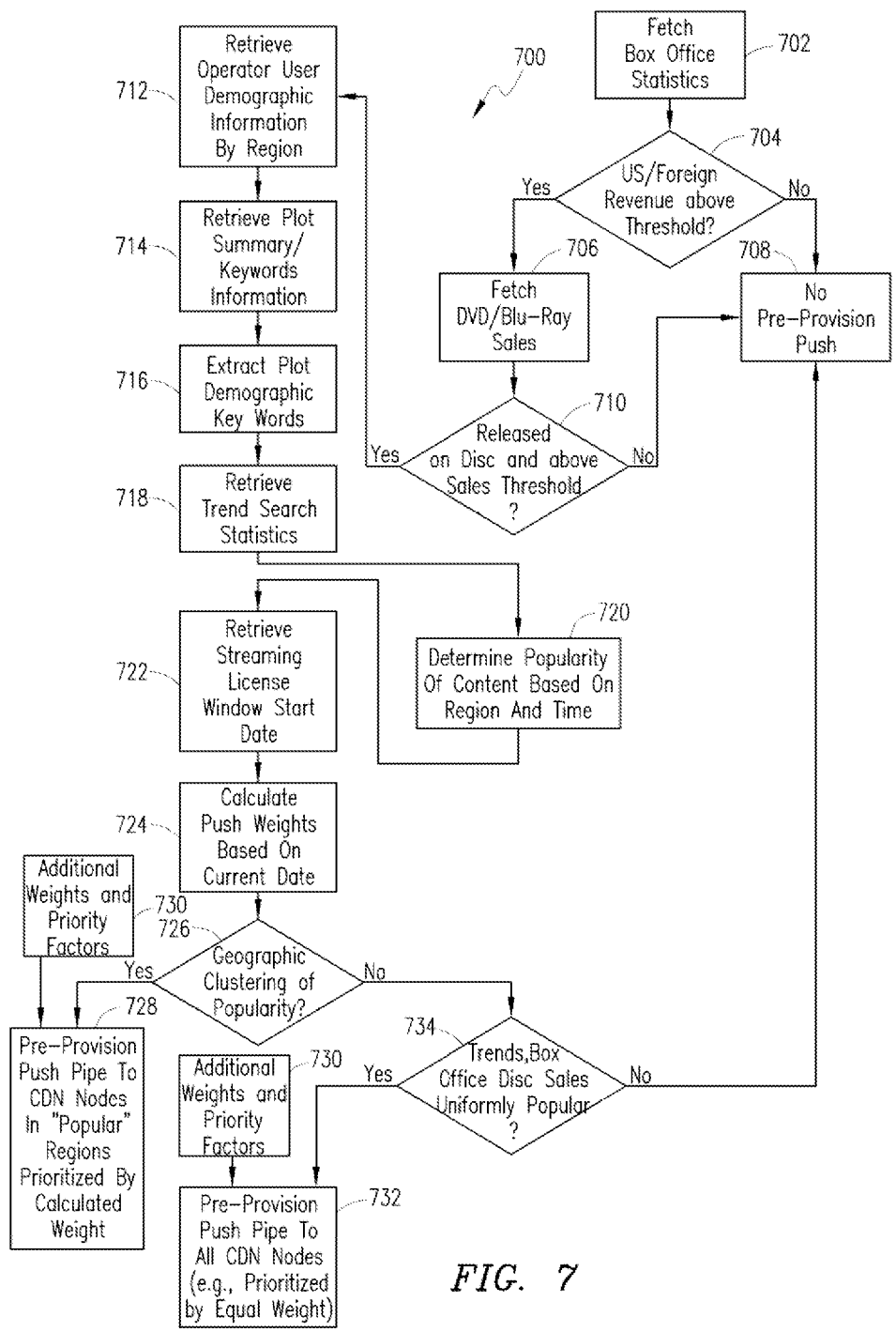
FIG. 7 depicts a flowchart with additional details relative to an example popularity-based content provisioning and delivery method according to an embodiment of the present patent application.

FIG. 7 depicts a flowchart with further details with respect to an example popularity-based content provisioning and delivery method 700 according to an embodiment of the present patent application, wherein additional acts, steps, functions, components or blocks that may be augmented within one or more variations of the process 500 described above are shown. After obtaining box office sales statistics relative to a particular content (block 702), a determination may be made (block 704) whether the worldwide box office revenues of the particular content exceed a revenue threshold (e.g., a first revenue threshold), which may be configurable or variable, pre-set or pre-determined, or determined based on appropriate market research estimates or otherwise. If the revenue data does not meet the threshold, an example implementation of the process 700 may lead to a decision that no push pre-provisioning is needed for that content (block 708). If the box office revenue data meets or exceeds the first revenue threshold, sales data of the storage media (DVD/HD/Blu-ray/CD or other shrink-wrapped product) pertaining to the content may be obtained and analyzed to determine if the sales (e.g., volume, total number of units sold, revenue, or any combination thereof) meets or exceeds a threshold, e.g., a second revenue threshold, as set forth at blocks 706, 710. Similar to the determination of block 704, if the storage media sales data does not satisfy the appropriate condition, no pre-provisioning of the content may be effectuated (block 708).

If the various revenue tests relative to the content are satisfied, a number of acts or steps may take place in order to obtain assorted data relevant to forecasting the popularity distributions of the content. Blocks 712-718 are illustrative with respect to obtaining user demographic information, keyword/plot information, extracting plot demographic keywords (e.g., socioeconomic and ethnic profiles of actors/actresses, locations where the plot takes place, etc.), and obtaining search trend statistics. It should be appreciated that blocks 702, 706 and 712-718 are roughly similar to blocks 502A-502C depicted in FIG. 5 discussed above, and as such, the revenue-based tests and retrieval of various pieces of data may take place in any order, sequentially or in parallel. Additionally, some implementations may selectively avoid certain revenue-based tests and/or retrieval of certain pieces of data depending on the statistical/mathematical modeling techniques used for forecasting. It is not a necessary requirement, therefore, that an implementation of the popularity-based content provisioning and delivery method 700 include each of the foregoing blocks in the same sequence as illustrated in FIG. 7.

After obtaining the relevant data, the content's popularity distributions are then determined (block 720). Push weights for the content may be calculated based on comparing the retrieved licensing window starting times against a current time (i.e., when the content provisioning and delivery method 700 is executed) as set forth in blocks 722 and 724. If there is a geographical clustering of the popularity distributions (i.e., the content is expected to be more popular in certain areas than in others), push pipes to the appropriate CDN nodes (e.g., nodes covering and/or closest to the "popular" areas) may be pre-provisioned, with suitable push weights as well as any other weight factors (e.g., weights used for a WFQ scheduling scheme, which may take into account both current and expected traffic conditions on the distribution pipes, operational status of target servers where the content is to be cached, subscriber device types/capabilities, etc.) and priority levels (e.g., based on high definition (HD) content vs. non-HD content, and other content policies), as set forth in blocks 726, 728 and 730. One skilled in the art will recognize that the priority levels may be assigned to the individual content files comprising various streams of content, for example, based on criteria including, but not limited to when the content files will be accessed from an edge server, which edge nodes the content files are destined for, whether the content files are associated with a streaming video service, whether the content files are associated with live subject matter occurring in real time, and/or the current state of content distribution in the CDN.

If the popularity distributions are determined to be roughly uniform across the relevant geographical region served by the CDN, push pipes with a default weighting (e.g., equal weights) may be pre-provisioned for all CDN nodes (block 732). In one optional variation, if there are no reasonable determinations with respect to the popularity distributions/trends, box office revenues or sales data trends, etc., the process may exit by taking the decision of not pre-provisioning the content in the CDN (block 708).

Figure 8A:
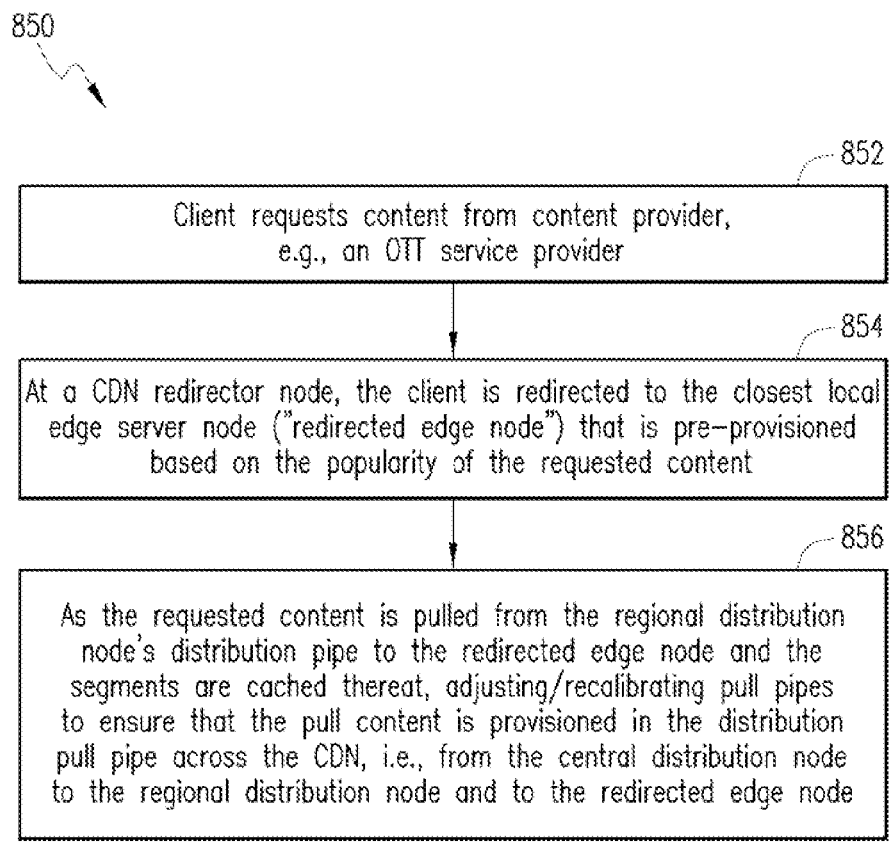
FIG. 8A depicts a flowchart of an example pull pipe bandwidth management methodology according to an embodiment of the present patent application.

It should be appreciated that when a push pre-provisioning policy is effectuated in a CDN, QoS requirements for pull content delivery may likely be impacted. Such a situation may arise especially where the request rerouting/redirection mechanisms of the CDN reroute a subscriber request for a particular content to a local edge server that is pre-provisioned for push content delivery because of the expected popularity distributions of the content. It can be seen that possible bandwidth limitations may occur once the content is initially determined or pre-determined to be popular and new joining subscribers for that content are redirected to the closest "popular" edge because the content flows from the regional distribution node through the connecting regional distribution pipe to the closest/redirected edge server where the content is cached as it is being delivered to the client device. FIG. 8A depicts a flowchart of an example pull pipe bandwidth management methodology according to an embodiment of the present patent application that addresses the foregoing concerns, inter alia. At block 852, a subscriber client device requests content from a content provider, e.g., an OTT service provider. The subscriber's request for the content is redirected to the closest local edge server (i.e., "redirected edge server" or "target edge server") that is pre-provisioned based on a popularity distribution of the requested content (block 854). As the requested content is pulled from the regional distribution node's outgoing distribution pipe to the redirected edge server in order to serve the redirected subscriber client, the pull pipes prioritized based on an intended QoS are readjusted or recalibrated to ensure that the pull content is provisioned in the distribution pull pipe across the entire CDN path, i.e., from the central distribution node to the regional distribution node and to redirected edge server so as to ensure that the intended QoS throughout the delivery flow pursuant to a QoS agreement associated with the delivery of the content to the requesting subscriber is satisfied (block 856). Accordingly, as part of the recalibration/adjustment to the pull pipe bandwidth, the pull pipe weights and/or priority levels associated with one or more of the outgoing delivery pipes (i.e., the central distribution pipe feeding the regional server and/or the regional distribution pipe feeding the redirected local edge server) may be assigned, modified or otherwise reassigned upon taking into account the expected bandwidth push pipe consumption for the particular content.

Figure 8B:
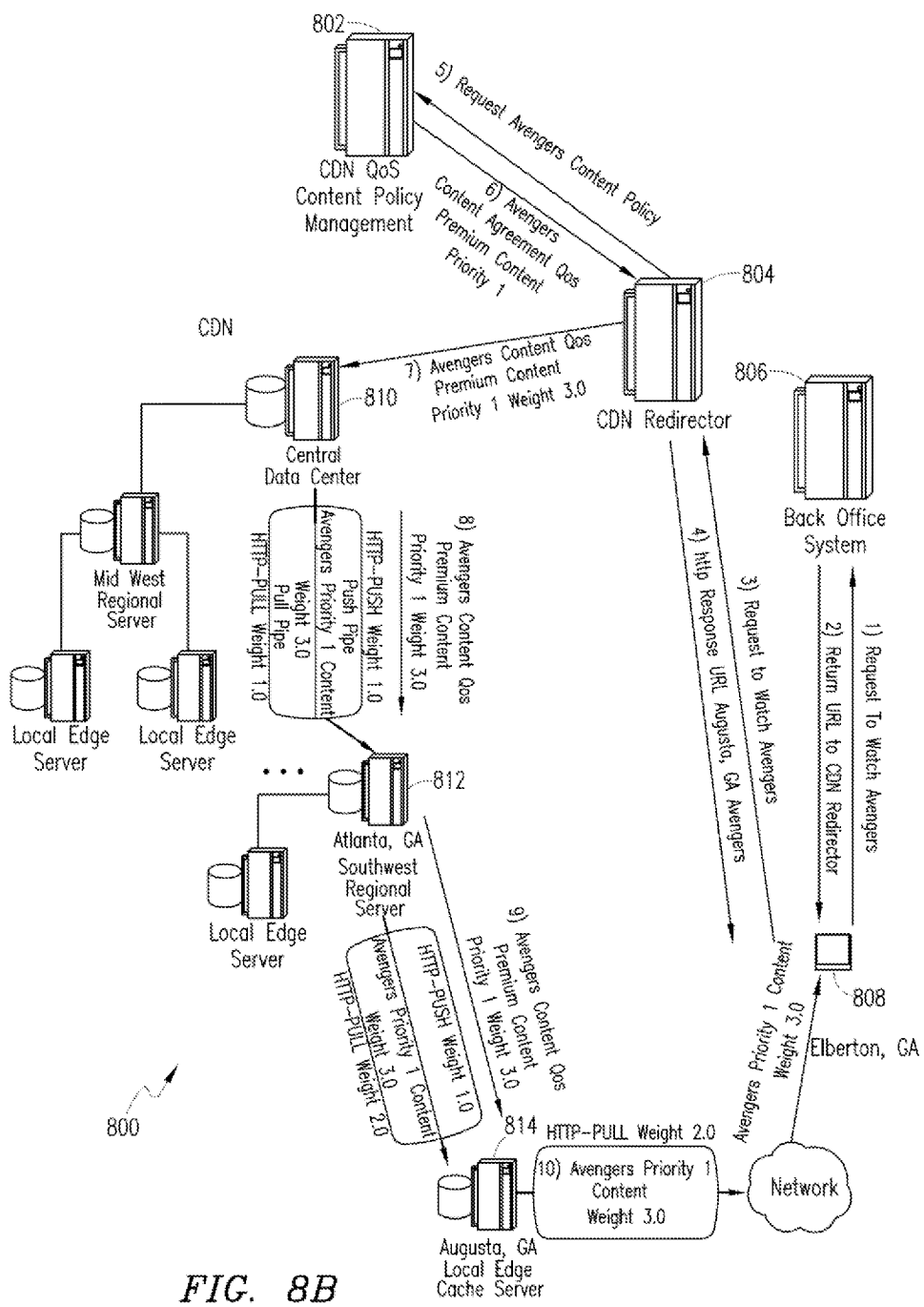
FIG. 8B depicts an example content delivery network having a request redirector node configured to manage pull pipe bandwidth allocation according to an embodiment of the present patent application.

FIG. 8B depicts an example content delivery network 800 having a request rerouting node 804 operable to manage pull pipe bandwidth allocation according to an embodiment of the present patent application. In reference to the example CDN 800, numerals (1) to (10) refer to the various operations that take place among a plurality of entities with respect to a subscriber request for a particular content (e.g., Avengers) from a subscriber client device 808 in a location (e.g., Elberton, Ga.). When the client device 808 makes the request (1) for Avengers, it is processed by a back office system 806, which then returns (2) a redirector's URL along with appropriate manifest information (e.g., encoding rates used for encoding the content, pointers to the segments/chunks into which the encoded content is divided, etc.) to the subscriber client device 808. The client request is accordingly transmitted to the request rerouting node 804, which provides a response (4) containing the URL of a local edge server 814 to which the client device is redirected (e.g., to a server located in Augusta, Ga.). The request rerouting node 804 also transmits a request (5) to a content policy management node 802, which in response provides (6) QoS policy information, priority level information, and other related data pertaining to the requested content, i.e., Avengers, to the rerouting node 804.

Continuing to refer to FIG. 8B, the rerouting node 804 processes the information obtained from the content policy management node 802 and transmits (7) the QoS policy information, content priority level information as well as one or more weights assigned to the requested content (e.g., Priority=1 and Weight=3) to a central distribution node or data center 810. It should be appreciated that the priority levels and weights may be assigned based at least in part upon a content policy (e.g., a policy based on QoS arrangements the operator makes with the content provider for a QoS contract obligation). Further, it could be a weight based on a subscriber-defined QoS in terms of the priority of the UE device. Responsive to the pieces of the information received from the rerouting node 804, the push and pull pipes associated with the entire delivery flow (i.e., involving a central distribution pipe and subsequent outgoing delivery pipes all the way to the redirected local edge server 814 in Augusta, Ga.) are adjusted or calibrated by distributing appropriate push and pull weights and priorities. As illustrated, the central data center node 810 adjusts the distribution pipe to the regional distribution node 812, which adjusts the distribution pipe to the redirected local edge server 814, as illustrated by operations (8) and (9), respectively. A local distribution pipe involving an access network operable to serve the client device 808 is also accordingly adjusted, as exemplified by operation (10).

Figure 9:
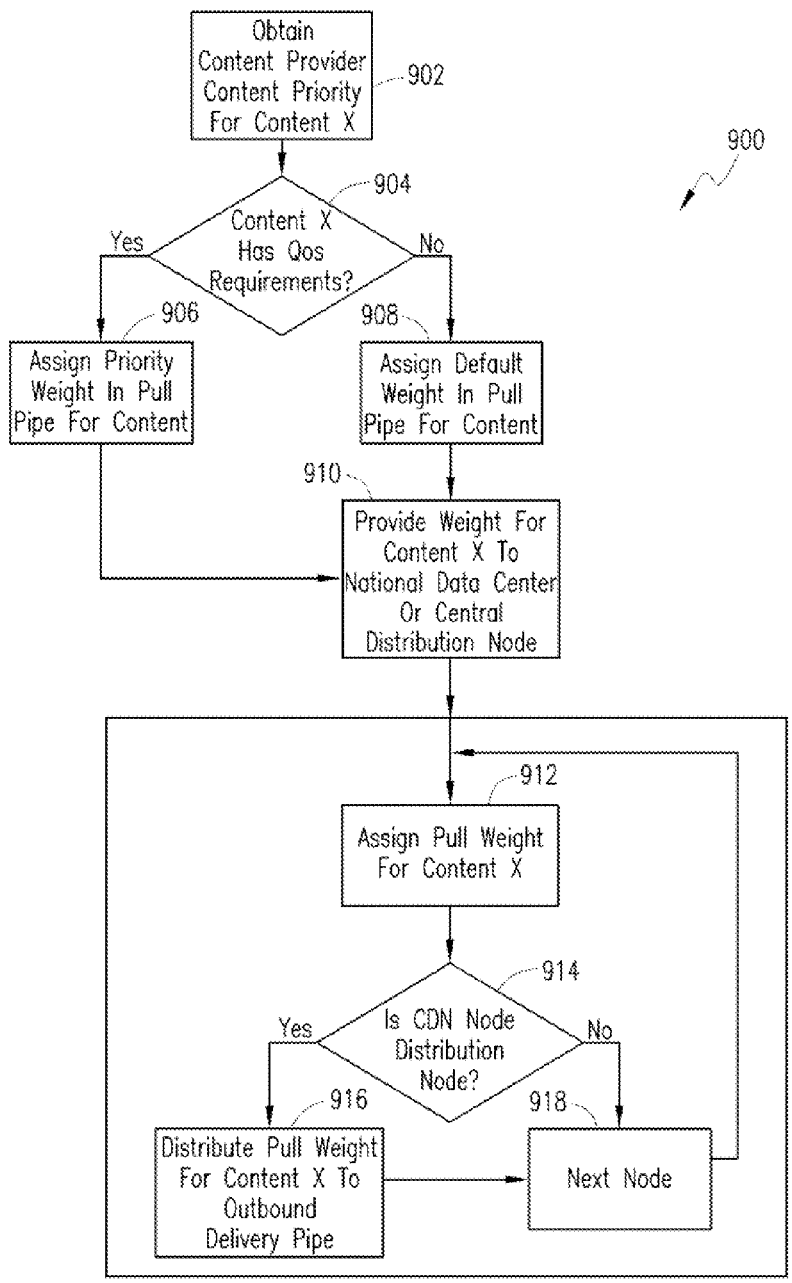
FIG. 9 depicts a flowchart with additional details relative to an example pull pipe bandwidth management methodology according to an embodiment.

FIG. 9 depicts a flowchart with additional details relative to an example pull pipe bandwidth management method 900 according to an embodiment wherein additional acts, steps, functions, components or blocks that may be complementary and/or supplementary with respect to one or more variations of the processes illustrated in FIGS. 8A and 8B are provided. At block 902, content policy and priority information with respect to a particular content (e.g., Content X) is obtained from a content provider. A decision block 904 is operative to determine if the content has QoS requirements, e.g., pursuant to a service level agreement. If the content is determined to have QoS requirements, appropriate priority/weight levels may be assigned to a pull pipe for the content (block 906). Otherwise, a default level may be assigned (block 908). Regardless of how the pull pipe priority/weights are assigned for the content, they are provided to a central distribution node (e.g., a national data center) of a CDN (block 910). An iterative process covering all the nodes in the CDN may be executed for distributing the appropriate pull priority/weight levels throughout the CDN. For each CDN node, appropriate pull pipe priority/weight levels are assigned (block 912), e.g., based on the information from the central distribution node. If the CDN node is a client delivery node, i.e., a node operative to support content delivery flow for a client, as set forth at decision block 914, the pull priority/weights are allotted or otherwise distributed to the outbound delivery pipe (block 916). Otherwise, the iterative process continues with respect to the next node in the CDN (block 916) until all the client delivery nodes in the CDN have appropriate pull pipe weights/priorities assigned to their respective outgoing distribution pipes.

Figure 10:
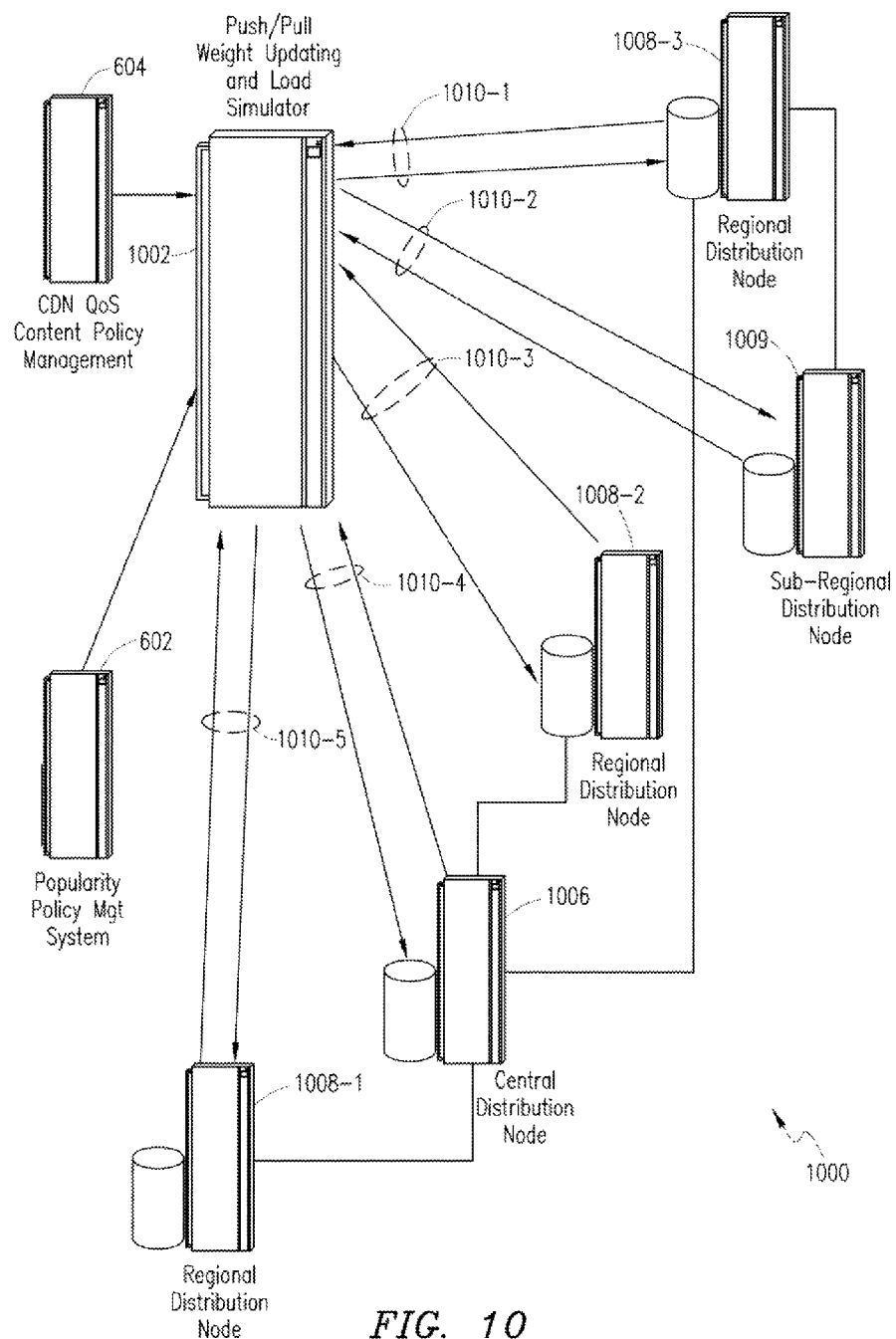
FIG. 10 depicts an example network element configured to provide network pipe optimization and self-correction in a content delivery network according to an embodiment.

FIG. 10 depicts an example network element 1002 configured to provide network pipe optimization and self-correction in a content delivery/distribution network 1000 according to an embodiment. In one implementation, the network element 1002 may be provided as an embodiment of the data processing node 400 configured to include appropriate process logic such as push/pull weight updating and load simulation for purposes of network optimization responsive to pipe utilization reports, network conditions, inter alia, received from the CDN. Broadly, the process logic executing on the network element 1002 is operative to examine current traffic flow in various connecting node pipes (i.e., distribution pipes) and determine if weighting adjustments are needed based on changes in the load of the distribution network environment 1000. If changes are needed, new weights may be calculated and load simulations may be run to determine if new weights will better optimize the bandwidth utilization. Once the weights are simulated and determined to improve utilization, the new weights may be applied to the outbound distribution pipes leaving that node. In addition, anticipated flow can be achieved for predictive-corrective network optimization by using estimated popularity distributions of content and pull pipe bandwidth reallocation techniques described above. By gathering new upcoming content's pull policies/weights, push policies/weights and license window information, a forecast of a change in weight distribution can be calculated. Based on the forecast, new calculated weights can be fed into the load simulator module of the network element 1002. If there is no network degradation using the current distribution/delivery simulation, the new weights may be applied to the outbound distribution pipes accordingly.

By way of illustration, the distribution network 1000 comprises a central distribution node 1006 and a plurality of regional distribution nodes 1008-1 to 1008-3, one of which is coupled to a sub-regional distribution node 1009. The network element 1002 is configured to receive pre-provisioning push priorities/weights from the popularity policy management system 602 as well as content QoS policy requirements and content priority information from the content QoS policy management node 604, described above in reference to FIG. 6. The network element 1002 is further configured to obtain network traffic conditions, push/pull pipe utilization reports, bandwidth allocation/consumption reports, etc. (collectively, "control information") from the distribution nodes of the network 1000 via any number of mechanisms, e.g., dynamic query/response mechanisms, automatic push notifications, periodic polling based on a predetermined schedule, ad hoc alert/error reporting, status updates, etc., which may involve interfacing with pipe control modules and/or bandwidth allocation and scheduling modules associated with the hierarchically organized distribution nodes. Reference numerals 1010-1 to 1010-5 refer to a plurality of communication interfaces provided with the network element 1002 for obtaining various pieces of control information from the central, regional and sub-regional nodes of the network 1000. Those skilled in the art will recognize that example communication interfaces 1010-1 to 1010-5 may represent back channel, sideband, out-of-band and in-band, etc. communication channels configured to couple the network element 1002 to the remainder of the CDN infrastructure.

Figure 11:
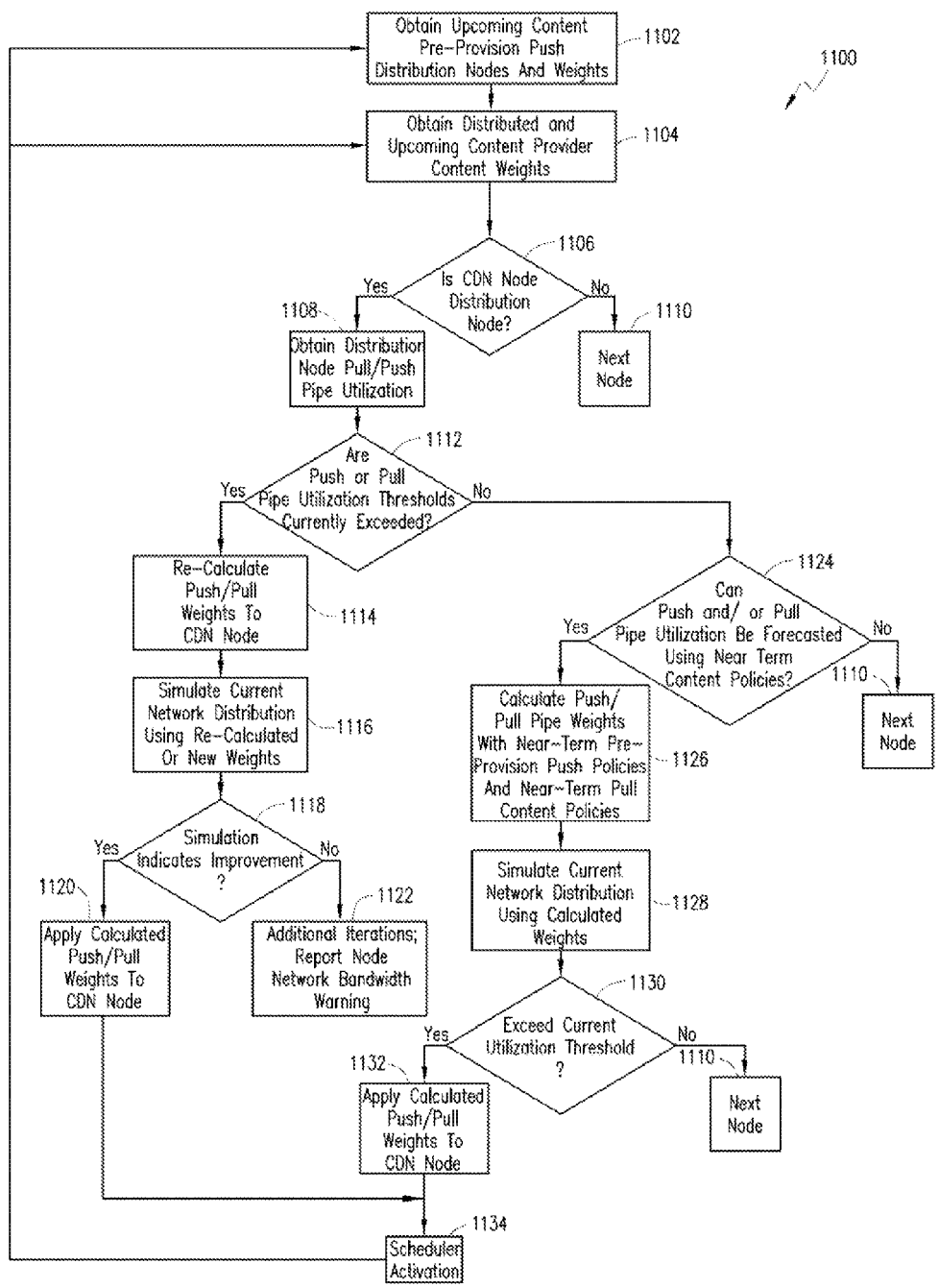
FIG. 11 depicts a flowchart of an example network pipe optimization methodology having features of one or more embodiments of the present patent application.

FIG. 11 depicts a flowchart of an example network pipe optimization methodology 1100 having features of one or more embodiments of the present patent application. It should be appreciated that at least some of the acts, steps, functions, components or blocks depicted in this FIGURE may take place at a network optimization node, e.g., network element 1002 shown in FIG. 10. Further, at least some of the acts, steps, functions, components or blocks may be executed in a different order than is shown, and may comprise acts, steps, functions, components or blocks that may be executed sequentially or in parallel. Additionally, some implementations may involve selective omission of certain acts, steps, functions, components or blocks depicted. It is not a necessary requirement, therefore, that an implementation of the network pipe optimization methodology 1100 include each of the blocks in the same sequence as illustrated in FIG. 11. At least in one implementation, the network pipe optimization methodology 1100 may be configured to effectuate the following: obtaining at least one of a push pipe utilization report and a pull pipe utilization report from each distribution node of the content delivery network; determining new push pipe weights and new pull pipe weights for distribution pipes associated with each distribution node of the content delivery network; simulating, using at least one of the new push pipe weights and new pull pipe weights, a network pipe utilization model associated with the content delivery network; and responsive to determining that the simulated network pipe utilization model yields an improved utilization of the content delivery network, distributing the new push pipe weights and new pull pipe weights to each distribution node in the content delivery network.

By taking reference to FIGS. 10 and 11 together, blocks 1102 and 1104 are illustrative with respect to obtaining by the network element 1002 the following pieces of information: (i) upcoming content pre-provisioning push distribution nodes and associated push weights pursuant to the push policies effectuated by the popularity policy management node 602; and (ii) distributed content QoS policies and weights from the content QoS policy management node 604, either sequentially or otherwise. An iterative process may be executed with respect to each of the CDN nodes, wherein a determination (block 1106) may initially be made as to whether a node is a distribution node or not. For purposes herein, a distribution node is a node that supports a content delivery pipe to another node. A local edge server node may be deemed a distribution node if it supports a content delivery pipe to another local edge server node via peering, for example. Accordingly, a local edge server node that is exclusively limited to serving end users only is not deemed a distribution node. If a node is not a distribution node, the process control flows returns (block 1110) to execution with respect to the next node of the network 1000. On the other hand, if the node is a distribution node, appropriate push/pull pipe utilization reports (e.g., for current consumption) are obtained from that node (block 1108). If the pipe utilization reports indicate that a threshold utilization level associated with the distribution node is exceeded (decision block 1112), new push/pull pipe weights may be determined or recalculated, e.g., taking into consideration content policy management inputs, bandwidth allocation/reallocation policies, as well as WFQ scheduling parameters (block 1114), which are then utilized in simulating current network distribution and load utilization, potentially based on a suitable network pipe utilization model (block 1116). If the simulation indicates improvement (e.g., as may be modeled using a number of network traffic parametrics in the network pipe utilization model), the new push/pull pipe weights are applied to the outgoing delivery pipes supported by the distribution node (block 1120). Otherwise, another iterative process may be executed (block 1122) to readjust and recalculate new push/pull pipe weights until the iterative simulation of the network pipe utilization model yields an improvement. Additionally or alternatively, a bandwidth warning for the node may be generated to appropriate management nodes of the CDN (block 1122). After the iterative processes are completed for all distribution nodes, the process flow may return to blocks 1102 and 1104 after a predetermined amount of time has elapsed pursuant to a scheduler (block 1134).

If the push/pull pipe utilization reports from a distribution node do not indicate that a threshold level for the node is currently exceeded (decision block 1122), a forecasting model may be used to predict anticipated flow and concomitant network utilization, for example, based on estimating popularity distributions of content for over a period of time (e.g., a near-term/mid-term prediction). If it is possible to forecast the anticipated flow and push/pull pipe utilization with a reasonable degree (decision block 1124), new push/pull pipe weights may be re/calculated, taking into consideration push pre-provisioning policies and/or pull content policies (block 1126). Otherwise, the process control flows returns (block 1110) to execution with respect to the next node of the CDN. Similar to the operations of block 1116, network distribution and load conditions may be simulated using the new weights (block 1128). If the simulated network distribution and load conditions with the calculated weights show that the current utilization threshold level is not exceeded (decision block 1130), the new push/pull pipe weights are applied to the outgoing delivery pipes supported by the distribution node (block 1132). Otherwise, the process control flows returns (block 1110) to execution with respect to the next node of the delivery network until all distribution nodes have been analyzed. As before, after the iterative processes are completed for all distribution nodes, the process flow may return to blocks 1102 and 1104 after a predetermined amount of time has elapsed responsive to a scheduler (block 1134).

It should be appreciated that at least some of the embodiments of the present disclosure can advantageously optimize CDN traffic flows to nodes that may experience congestion by minimizing the pull data flow to such nodes. Further, one or more additional embodiments of the present disclosure may be configured to facilitate adaptive bandwidth allocation policy management in a self-corrective CDN based on current network conditions as well as anticipated content distribution and utilization.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A network pipe usage optimization method operable in a content delivery network, the method comprising:
   obtaining at least one of a push pipe utilization report and a pull pipe utilization report from each distribution node of the content delivery network, wherein the distribution nodes are organized into multiple hierarchical levels, the push pipe utilization and pull pipe utilization reports indicating current consumption of push content and pull content via all outgoing distribution pipes from a distribution node to another downstream CDN node;
   determining new push pipe weights and new pull pipe weights for the outgoing distribution pipes associated with each distribution node of the content delivery network responsive to the push pipe and pull pipe utilization reports and a pre-provisioning push policy from a popularity policy management node with respect to a particular push content to be distributed via the CDN;
   simulating, using at least one of the new push pipe weights and new pull pipe weights, a network pipe utilization model associated with the content delivery network; and
   responsive to determining that the simulated network pipe utilization model yields an improved utilization of the content delivery network, distributing the new push pipe weights and new pull pipe weights to each distribution node in the content delivery network, wherein the new push pipe weights and new pull pipe weights are operative to apportion bandwidth of each outgoing distribution pipe from a distribution node to another downstream CDN node.

2. The method as recited in claim 1, further comprising:
   prior to determining the new push pipe weights and new pull pipe weights, determining if the push pipe utilization and pull pipe utilization reports from a distribution node indicate exceeding a threshold utilization level for that distribution node.

3. The method as recited in claim 2, further comprising:
   determining if push and pull pipe utilization parameters can be forecasted for over a period of time using at least one of anticipated content popularity distributions and current push content and pull content policies; and
   if so, calculating the new push pipe weights and new pull pipe weights based on forecasted push and pull pipe utilization.

4. The method as recited in claim 1, further comprising:
   if the simulated network pipe utilization model does not yield an improved utilization of the content delivery network, readjusting new push pipe weights and new pull pipe weights until an iterative simulation of the network pipe utilization model yields an improved utilization.

5. The method as recited in claim 4, further comprising:
   if the iteratively simulated network pipe utilization model does not yield an improved utilization of the content delivery network, generating a bandwidth warning report to a policy management node associated with the content delivery network.

6. The method as recited in claim 1, wherein the new push pipe weights and new pull pipe weights are determined further based upon which of the distribution nodes will be provisioned for supporting upcoming push content pipes responsive to anticipated popularity distributions of content to be delivered by the content delivery network.

7. The method as recited in claim 6, wherein the anticipated popularity distributions are determined based on at least one of content-specific trend data in a geographical region serviced by the content delivery network, demographic data of subscribers serviced by the content delivery network, and content-specific revenue sales data.

8. A network element configured to operate in association with a content delivery network, the network element comprising:
   one or more processors;
   a memory subsystem coupled to the one or more processors, the memory subsystem including a persistent memory; and
   a network pipe usage optimization module implemented in the persistent memory and configured to be executed by the one or more processors for performing:
      obtaining at least one of a push pipe utilization report and a pull pipe utilization report from each distribution node of the content delivery network, wherein the distribution nodes are organized into multiple hierarchical levels, the push pipe utilization and pull pipe utilization reports indicating current consumption of push content and pull content via all outgoing distribution pipes from a distribution node to another downstream CDN node;

determining new push pipe weights and new pull pipe weights for the outgoing distribution pipes associated with each distribution node of the content delivery network responsive to the push pipe and pull pipe utilization reports and a pre-provisioning push policy from a popularity policy management node with respect to a particular push content to be distributed via the CDN;

simulating, using at least one of the new push pipe weights and new pull pipe weights, a network pipe utilization model associated with the content delivery network; and responsive to determining that the simulated network pipe utilization model yields an improved utilization of the content delivery network, distributing the new push pipe weights and new pull pipe weights to each distribution node in the content delivery network, wherein the new push pipe weights and new pull pipe weights operate to apportion bandwidth of each outgoing distribution pipe from a distribution node to another downstream CDN node.

9. The network element as recited in claim 8, wherein the network pipe usage optimization module is further configured to:

prior to determining the new push pipe weights and new pull pipe weights, determine if the push pipe utilization and pull pipe utilization reports from a distribution node indicate exceeding a threshold utilization level for that distribution node.

10. The network element as recited in claim 9, wherein the network pipe usage optimization module is further configured to:

determine if push and pull pipe utilization parameters can be forecasted for over a period of time using at least one of anticipated content popularity distributions and current push content and pull content policies; and if so, calculating the new push pipe weights and new pull pipe weights based on forecasted push and pull pipe utilization.

11. The network element as recited in claim 9, wherein the network pipe usage optimization module is further configured to:

if the simulated network pipe utilization model does not yield an improved utilization of the content delivery network, readjust new push pipe weights and new pull pipe weights until an iterative simulation of the network pipe utilization model yields an improved utilization.

12. The network element as recited in claim 11, wherein the network pipe usage optimization module is further configured to:

if the iteratively simulated network pipe utilization model does not yield an improved utilization of the content delivery network, generating a bandwidth warning report to a policy management node associated with the content delivery network.

13. The network element as recited in claim 9, wherein the network pipe usage optimization module is configured to determine the new push pipe weights and new pull pipe weights further based upon which of the distribution nodes will be provisioned for supporting upcoming push content pipes responsive to anticipated popularity distributions of content to be delivered by the content delivery network.

14. The network element as recited in claim 13, wherein the anticipated popularity distributions are determined based on at least one of content-specific trend data in a geographical region serviced by the content delivery network, demographic data of subscribers serviced by the content delivery network, and content-specific revenue sales data.

\* \* \* \* \*